Dec. 29, 1970     G. R. GOOD     3,551,868
THERMAL RELAY AND LIMIT SWITCH
Filed Jan. 22, 1969
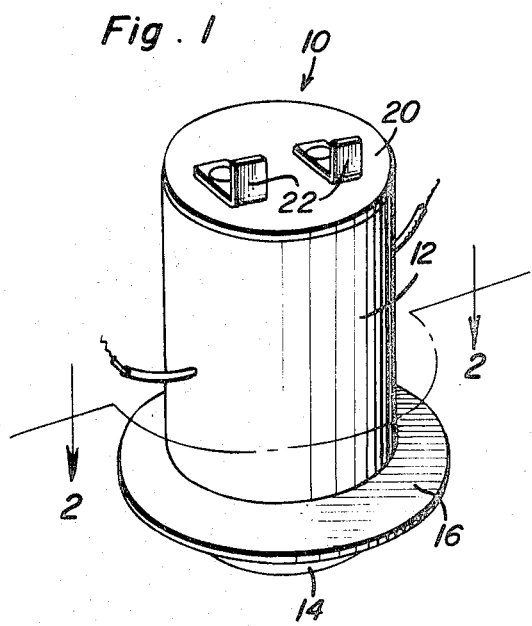
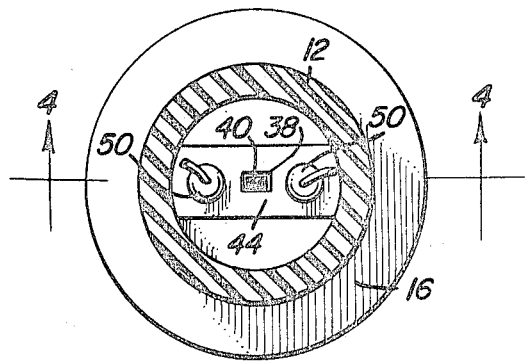
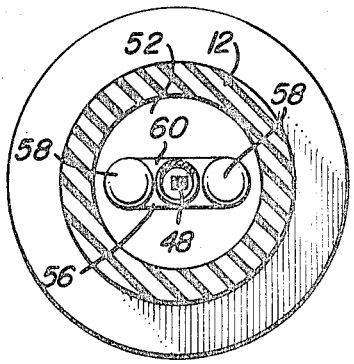
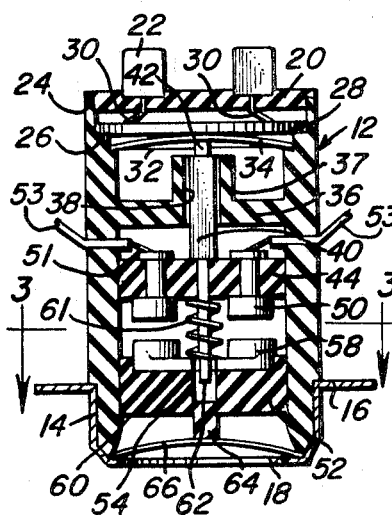
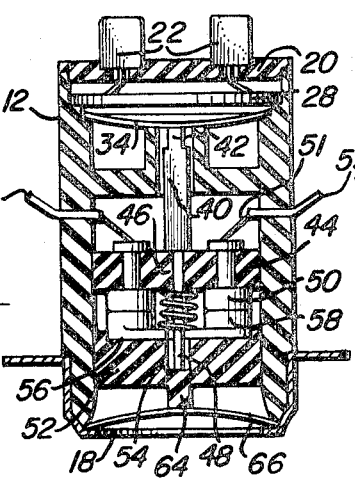
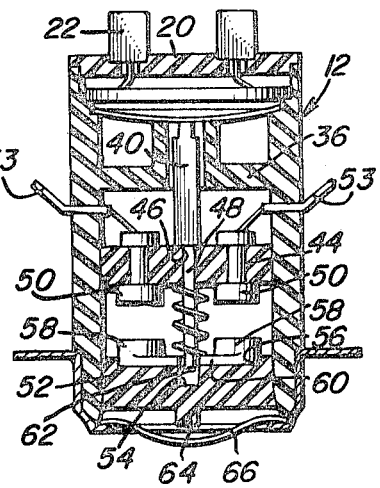
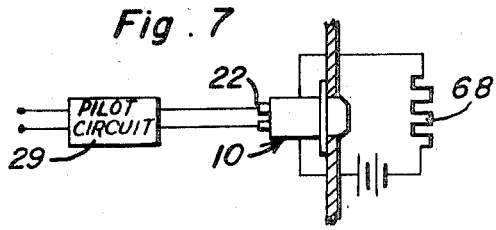
George R. Good
INVENTOR.

United States Patent Office 3,551,868
Patented Dec. 29, 1970

---

3,551,868
THERMAL RELAY AND LIMIT SWITCH
George R. Good, 1703 Toplea, Euless, Tex. 76039
Filed Jan. 22, 1969, Ser. No. 792,982
Int. Cl. H01h 37/52, 61/013
U.S. Cl. 337—96                                6 Claims

ABSTRACT OF THE DISCLOSURE

A thermal relay switch having normally opened contacts slidably mounted within a housing. To close the contacts, a heater within the housing is energized which causes a bimetallic disk to deform in a direction causing contacts to close. A second bimetallic disk normally supporting one of the contacts is sensitive to the temperature of a space being monitored. When the temperature in the space exceeds a preselected minimum, the second bimetallic disk deforms thereby resulting in the loss of support for the second contact which insures the separation or disengagement between the contacts.

---

The present invention relates to switches and more particularly to thermal switches.

In the past, a number of thermal switches have been designed for monitoring the temperature of a heated space within an enclosure. In operation, the switches sense a predetermined maximum temperature in the enclosure, indicative of an abnormal condition which causes the switch to open thereby breaking the enclosure heating circuit. The switch may be considered as a thermal circuit breaker. In many processes, it is desirable to include a thermal control in a remote location capable of regulating the temperature within a heated enclosure. Such a device would automatically initiate energization of the means for heating the enclosure and when the temperature within the enclosure exceeds a preselected value, energization of the heating means would be terminated.

The present invention includes a switch device which can automatically regulate the electrical means for heating an enclosure. In brief, the invention includes a switch housing having a control heater therein. It is emphasized that the control heater is separated and distinct from the enclosure heating means which is governed by the present switch as a whole. When energized, the control heater causes a bimetallic disk to engage electrical switch contacts and urge them to make electrical connection. A second counteracting bimetallic disk located in the switch housing communicates with the interior space of an enclosure to be monitored. The second disk supports an electrical contact when the switch is in a closed state. However, upon attainment of a preselected temperature within the enclosure, indicative of an abnormal condition, the second bimetallic disk deforms thereby removing the support for the second electrical contact. As a result, the electrical contacts disengage and break an external heater circuit which causes enclosure heating.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the exterior appearance of a switch assembly constructed in accordance with the present invention.

FIG. 2 is a transverse cross-sectional view taken along a plane passing through section line 2—2 of FIG. 1.

FIG. 3 is a transverse sectional view taken along a plane passing through section line 3—3 of FIG. 4.

FIG. 4 is a longitudinal sectional view taken along a plane passing through section line 4—4 of FIG. 2, illustrating the disposition of the switch components in a deenergized state.

FIG. 5 is a view similar to FIG. 4 illustrating the disposition of the switch components in an energized or closed condition.

FIG. 6 is a view similar to that shown in FIG. 5 wherein the switch components are illustrated when a preselected temperature is sensed by the switch thereby causing the disengagement of the switch contacts.

FIG. 7 is a diagrammatic illustration of a typical installation for the switch assembly.

Referring to the drawings and more particular FIG. 1 thereof, one embodiment of a switch assembly illustrated, generally denoted by reference numeral 10. The switch assembly is enclosed by a cylindrical housing 12 terminating at a lower end in a cap portion 14. The cap portion extends outwardly to an annular flange 16 which is adapted to seat against the wall of a heated enclosure into which the cap portion 14 projects as diagrammatically shown in FIG. 7. The end of the cap portion 14 includes a large aperture 18 as shown in FIG. 4 to permit communication between the interior of the switch housing and the space within the enclosure. This arrangement permits the switch to monitor heat conditions in the enclosure.

The top of the cylindrical housing 12 includes a disklike closure 20 having suitable electrical terminals 22 riveted or otherwise attached thereto. Referring to FIG. 4 again, an annular recess 24 is peripherally formed in the closure member 20 which permits the seating of the closure member upon the upper edge of the cylindrical housing portion 12 thereby forming a sealed end.

A small distance beow the top end of the housing 12, an internal shoulder 26 is formed for supporting a suitable control heater 28 fabricated in the form of a disk. Electrical leads 30 are received within the closure member 20 and pass inwardly to the housing for connection to the heater 28. Thus, when current supplied from a remote location from a pilot circuit 29, as shown in FIG. 7, flows between terminals 22 of the switch, energizing current is fed to the heater 28 causing the generation of heat therefrom. A second annular shoulder 32 is formed in the interior wall of the housing 12, axially spaced from the aforementioned annular shoulder 26. A deformable bimetallic disk 34 is coaxially mounted within the housing so that the outer periphery thereof is supported by the annular shoulder 32. As will be noted from FIG. 4, the central portion of the disk is free to move axially through the void encircled by shoulder 32.

An annular partition 36 extends inwardly from the interior surface of the cylindrical housing 12 in axially spaced relation to the annular shoulder 32. A central portion of the partition 36 includes an integrally formed boss element 37 having a centrally formed bore 38 therein. The bore is rectangular in cross-section as seen in FIG. 2. The bore receives a rectangular section of an axially slidable shaft 40. The reason for fabricating the shaft section and mating bore with the rectangular cross-section is for the purpose of preventing rotational movement of the switch components.

Referring to FIG. 5, the upper end of the shaft 40 includes an actuating projection 42 which engages the confronting surface of bimetallic disk 34. In normal operation of the device, the position of shaft 40 is controlled by the disposition of bimetallic disk 34.

Referring to FIGS. 2, 3 and 4, an oblong sliding member 44 is disposed in axially spaced relation to partition 36, the oblong member being made of a nonconductive material and having a major axis equal in length to the interior diameter of the cylindrical housing 12. The oblong member 44 includes a centrally disposed bore 46 therein which permits the passage of an elongated small cross-sectional section 48 of shaft 40. The cross-sectional area of the latter mentioned rod section is also rectangular as more clearly seen in FIG. 3 thereby preventing relative rotation between sliding member 44 and the shaft 40. A pair of suitable electrical contacts 50 are embedded adjacent opposite ends within the oblong member 44. Flexible electric leads 51 extend toward the cylindrical housing 12 from the nonengaging surface of each electrical contact 50. The outer ends of the leads are attached to respective quick-connect terminals 53 embedded within the cylindrical housing 12 and extending outwardly therefrom. The terminals permit rapid connection of circuit leads thereto.

Referring to FIGS. 3 and 4, a second cylindrical sliding member 52 also made of nonconductive material is axially spaced from the first-mentioned sliding member 44. The upper surface of the latter mentioned sliding member 52 includes a central recess 54 therein for receiving the lower end 62 of rod section 48. An oblong recess 56 is formed in the upper surface of the cylindrical sliding member 52, the recess being adapted to receive a pair of bridging electrical contacts 58 longitudinally aligned with respect to electrical contacts 50. The electrical contacts 58 are connected together by an oblong flange 60 clearly shown in FIG. 3. As will be noticed, the contacts 58 are electrically shorted by virtue of connecting flange 60 which is fabricated from a conducting material. Closed switch action is accomplished when contacts 50 and 58 become engaged so that electrical conductivity is established between connecting leads 51, as shown in FIG. 5.

In operation of the device, FIG. 4 represents the deenergized or deactivated state of the switch device. In this state, no electrical power is being furnished to the terminals 22 so that the heater 28 remains deenergized. In this condition bimetallic disk 34 is curved upwardly. By virtue of a compression coil spring 61 disposed on the elongated rod section 48 between sliding members 44 and 52, sliding member 44 is retained in one limit position whereby the electrical contacts 50 and 58 are axially separated. This position of sliding member 44 is determined by engagement between shaft projection 42 and the bimetallic disk 34. The shoulder defined between the large and small cross-sectional portions of shaft 40 abuts sliding member 44 so as to transmit movement in both axial directions.

As will be noted, a bimetallic disk 66 is mounted at the end of housing 12 within cap portion 14 and is curved upwardly so as to engage an axial projection 64 extending axially from the sliding member 52. Engagement between the disk 46 and the projection 64 limits travel of the sliding member 52.

Referring to FIG. 5, the closed state of the switch device is shown. In this state, electrical energy is being supplied to the terminals 22 which causes energization of heater 28 which in turn results in the inward deformation of bimetallic disk 34. This deformation urges displacement of shaft 40 which in turn presses the sliding member 44 until engagement between electrical contacts 50 and 58 is effected to electrically interconnect leads 51.

The circuit breaking capability of the present device is illustrated in FIG. 6 wherein the bimetallic disk 66 is seen to be deformed outwardly of the housing due to the exposure of the disk to the environment being monitored at a predetermined temperature. This deformation removes support between the disk 66 and the projection 64 of the sliding member 52. Thus, due to the outward urging of spring 61, the sliding member 52 travels outwardly resulting in the disengagement between electrical contacts 50 and 58 to open the circuit associated with terminals 53.

In an application as diagrammatically shown in FIG. 7 by way of example only, the electrical leads 51 are connected to a heater 68 for heating an enclosure to which the opening 18 in housing 12 is subjected. Circuit breaker action results in the de-energization of the heater circuit so that the enclosure may cool to a normal operating temperature.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination with a temperature controlled environment and a temperature controlling circuit, a thermal relay switch assembly connected to said circuit comprising a housing having opposite opened ends, a thermal sensing element exposed to said environment closing one of said ends of the housing, a heater device closing the other of the ends of the housing, contact means connected to said circuit and mounted within the housing for movement between circuit opening and closing positions, actuating means disposed in the housing and operatively connected to the contact means for displacement thereof to the circuit closing position in response to energization of the heater device, and means responsive to deformation of said thermal sensing element for opening the contacts and disrupting the circuit when a predetermined environmental heat condition occurs.

2. A thermal switch comprising a housing having an opening at one end communicating with a space, first and second electrical contacts within the housing, a means for biasing the contacts to separate positions, heater means located in the housing, a first thermally sensitive body enclosed in the housing and positioned near the heater means, the body being deformable in response to energization of the heater means, is a pilot circuit for energizing the heater means when the switch is to be automatically closed, a first motion translating means connecting the thermally sensitive body and the first contacts to cause movement of the first contacts into circuit making engagement with the second contacts when the heater means is energized, a second thermally sensitive deformable body covering the housing opening, second motion translating means connecting the second deformable body and the second contacts to cause circuit breaking movement of the second contacts from the first contacts upon the occurrence of a preselected temperature condition at the opening.

3. The device set forth in claim 2 wherein the first and second motion translating means include axially slidable mounting members securing the first and second contacts thereon, the first mounting member having an axially aligned aperture for receiving a slidable shaft therein, the shaft having a shoulder portion abutting a surface of the first mounting member, the second mounting member including a recess therein to seat an end of the sliding shaft, the biasing means abutting the second mounting member for urging following engagement between the second mounting member and the second thermally sensitive deformable body.

4. A thermal switch comprising a housing having an opening at one end communicating with a space, first and second electrical contacts within the housing, a means for biasing the contacts to separated positions, heater means enclosed in the housing, a first thermally sensitive body enclosed in the housing and positioned near the heater means to be deformable in response to energization of the heater means, a slidable shaft connected to the first contact and engaged by the first thermally sensitive body, a second thermally sensitive deformable body positioned adjacent the housing opening and engaging the second contact, the second contact being displaceable in response to movement of the second thermally sensitive body, the biasing means disengaging the contacts in response to displacement of the second deformable body out of contact with the second contact upon the occurrence of a preselected temperature at the opening, two axially slidable mounting members for securing the first and second contacts thereon, one of the mounting members having an axially aligned aperture receiving the slidable shaft therein, the shaft having a shoulder portion abutting a surface of the latter mounting member, the biasing means exerting a compressive force upon an opposite surface of said latter mounting member, the other mounting member including a recess therein to receive the sliding shaft, the biasing means also abutting the other mounting member for urging engagement between the other mounting member and the second thermally sensitive deformable body.

5. The device set forth in claim 4 wherein the first and second thermally sensitive bodies are fabricated in the form of bimetallic disks.

6. The device set forth in claim 5 wherein the biasing means includes a coil spring disposed between confronting surfaces of the mounting members.

References Cited

UNITED STATES PATENTS

| | | | |
|---|---|---|---|
| 3,023,350 | 2/1962 | Broadley et al. | 337—102X |
| 2,891,124 | 6/1959 | Vaughan | 337—102 |
| 2,753,421 | 7/1956 | Mertler | 337—380X |
| 2,300,530 | 11/1942 | Swingle | 337—89X |

BERNARD A. GILHEANY, Primary Examiner

D. M. MORGAN, Assistant Examiner

U.S. Cl. X.R.

337—102, 354